United States Patent
Yamaguchi et al.

(10) Patent No.: US 9,027,413 B2
(45) Date of Patent: May 12, 2015

(54) AIRFLOW MEASURING DEVICE

(75) Inventors: Junzo Yamaguchi, Nagoya (JP); Takao Ban, Toyohashi (JP)

(73) Assignee: Denso Corporation, Kariya (JP)

( * ) Notice: Subject to any disclaimer, the term of this patent is extended or adjusted under 35 U.S.C. 154(b) by 343 days.

(21) Appl. No.: 13/586,228

(22) Filed: Aug. 15, 2012

(65) Prior Publication Data

US 2013/0047742 A1 Feb. 28, 2013

(30) Foreign Application Priority Data

Aug. 26, 2011 (JP) .................... 2011-184500
Mar. 16, 2012 (JP) .................... 2012-060318

(51) Int. Cl.
*G01F 1/684* (2006.01)
*G01F 5/00* (2006.01)

(52) U.S. Cl.
CPC .............. *G01F 1/684* (2013.01); *G01F 1/6842* (2013.01); *G01F 1/6845* (2013.01); *G01F 5/00* (2013.01)

(58) Field of Classification Search
CPC ......... G01F 1/684; G01F 5/00; G01F 1/6845; G01F 1/6842
USPC ............... 73/861.08, 204.22, 204.24, 204.25, 73/204.26
See application file for complete search history.

(56) References Cited

U.S. PATENT DOCUMENTS

| | | | |
|---|---|---|---|
| 5,723,784 A | 3/1998 | Lembke et al. | |
| 6,553,829 B1 * | 4/2003 | Nakada et al. | 73/204.26 |
| 6,715,339 B2 * | 4/2004 | Bonne et al. | 73/24.01 |
| 2003/0019289 A1 * | 1/2003 | Ueyama et al. | 73/204.22 |
| 2003/0172731 A1 * | 9/2003 | Kohno et al. | 73/204.22 |
| 2005/0252289 A1 * | 11/2005 | Kitahara et al. | 73/204.22 |
| 2008/0053215 A1 | 3/2008 | Yamada et al. | |
| 2009/0126477 A1 * | 5/2009 | Saito et al. | 73/204.25 |
| 2010/0313651 A1 | 12/2010 | Hidaka et al. | |

FOREIGN PATENT DOCUMENTS

| | | |
|---|---|---|
| JP | H03-261868 A | 11/1991 |
| JP | 2001-249041 A | 9/2001 |
| JP | 2002-318148 A | 10/2001 |
| JP | 2010281809 | 12/2010 |

* cited by examiner

*Primary Examiner* — Lisa Caputo
*Assistant Examiner* — Philip Cotey

(57) ABSTRACT

A circuit board has a hollow space partitioned with a detection film on the front side exposed in a passage. The circuit board is accommodated in a recess of a support member and opposed to a bottom surface of the recess on the rear side. The bottom surface of the recess has a groove on one side in both the X-axis and Y-axis directions relative to the detection film. The groove inclines airflow in the groove relative to both the X-axis and Y-axis directions to guide the airflow toward the rear side of the detection film.

13 Claims, 12 Drawing Sheets

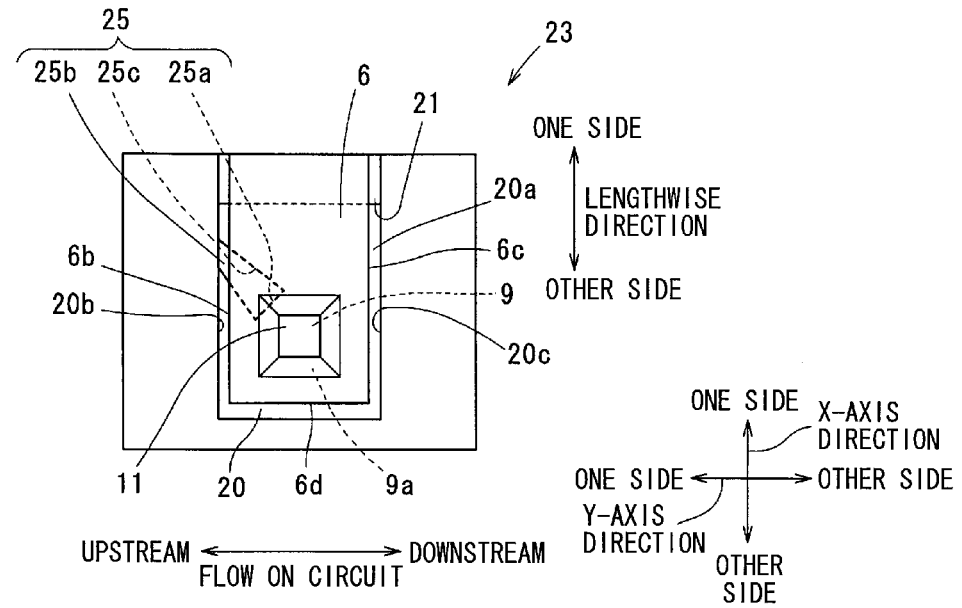
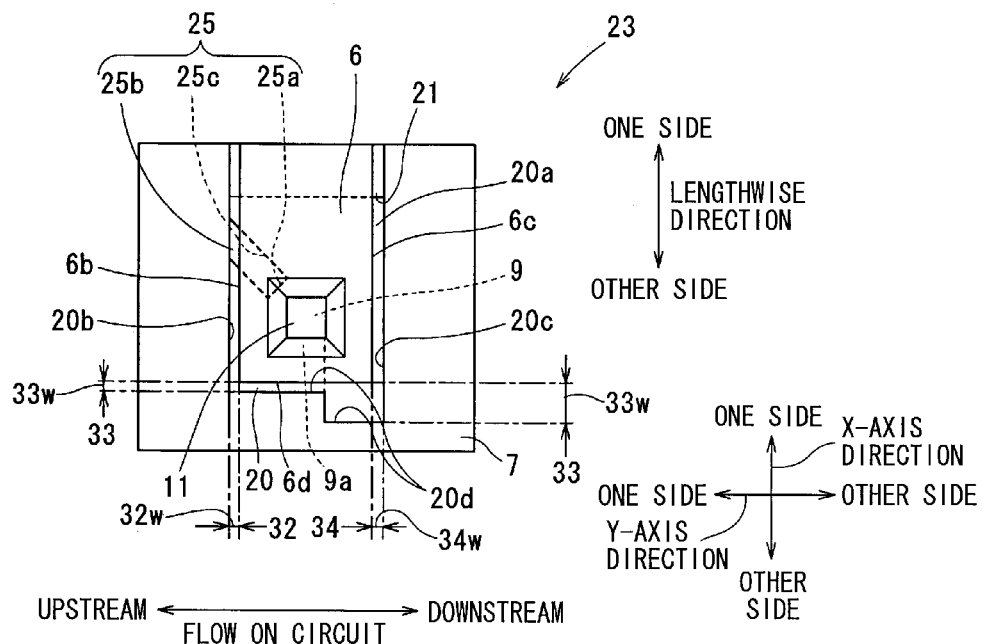

AIRFLOW MEASURING DEVICE

CROSS REFERENCE TO RELATED APPLICATIONS

This application is based on reference Japanese Patent Applications No. 2011-184500 filed on Aug. 26, 2011 and No. 2012-60318 filed on Mar. 16, 2012, the disclosures of which are incorporated herein by reference.

TECHNICAL FIELD

The present disclosure relates to an airflow measuring device configured to measure airflow, which is, for example, drawn into an internal combustion engine.

BACKGROUND

Conventionally, a known thermal-type airflow measuring device is employed to measure an air flow rate according to heat transfer from a heating element to air. Such a known thermal-type airflow measuring device is employed for measuring a flow rate of air, which is, for example, drawn into an internal combustion engine. In view of enhancing response and measurement accuracy, one example of a thermal-type airflow measuring device employs a semiconductor substrate equipped with a sensing element such as a heating element.

One example of a generally-known airflow measuring device includes a sensing element, a circuit board, and a support member. The sensing element is, for example, a heating element located in a predetermined passage and configured to change its electric input-and-output state according to a flow rate of air in the passage. The circuit board is a rectangular flat component having a hollow space depressed from its rear side toward its front side. A thin film is equipped to the circuit board to partition the front side of the hollow space. The sensing element is equipped on the surface of the thin film. The support member has a predetermined recess accommodating the circuit board. The support member supports the circuit board, such that the front side of the circuit board is exposed in the passage, and the longitudinal direction of the circuit board is substantially perpendicular to the flow direction of air passing on the front side of the circuit board.

The circuit board accommodated in the recess needs to be affixed to the support member. Therefore, adhesive is applied to, for example, the rear surface of the circuit board and bonded to the bottom surface of the recess with the adhesive. In such a configuration where the circuit board is bonded with adhesion, distortion may occur in the circuit board due to the difference in linear expansion between the circuit board and the support member to result in change in the characteristic of the sensing element. In consideration of this, for example, adhesive is applied only to the rear surface of the circuit board on one side in the longitudinal direction, and the circuit board is bonded to the bottom surface of the recess. Thus, the circuit board in the recess is supported by the bottom surface via the rear surface only on one side to form a cantilever configuration.

In such a cantilever configuration, the rear surface of the circuit board and the bottom surface of the recess form a gap therebetween. Therefore, air passing through the passage partially flows along the front side of the circuit board and partially flows into the gap on the rear side of the circuit board. Thus, underflow of air is caused in the gap one the rear side of the circuit board. When the underflow causes turbulence, measurement accuracy of the airflow measuring device decreases. In consideration of this, it is conceivable to employ a configuration to stabilize the underflow and/or to restrict air from passing on the rear side of the thin film.

For example, in an airflow measuring device according to a patent document 1, a groove is formed in the bottom surface of the recess at the position opposed to the periphery of the circuit board. In addition, the groove is partially enlarged outward beyond the periphery. The configuration of the patent document 1 is supposed to restrict the underflow from flowing on the rear side of the thin film and to reduce adverse effect caused by the underflow and exerted to the sensing element on the surface of the thin film.

It is noted that, in the configuration of the patent document 1, the configuration of the groove is complicated to restrict sufficiently the underflow from flowing on the rear side of the thin film. Specifically, the support member needs to be divided into multiple members and needs to be assembled into a singular component to result in increase in cost and increase in its manufacturing process. Furthermore, in the configuration of the patent document 1, characteristics of the assembled support member may have a large variation thereamong due to, for example, dimensional tolerance of the components of the support member. In addition, in the configuration of the patent document 1, the groove is formed in the enlarged area not to be entirely covered with the circuit board, and therefore, dust may adhere partially to the enlarged area and may stack in the groove. In this case, such dust stuck in the groove may cause fluctuation in both the underflow and airflow on the front side of the circuit board to impair the measurement accuracy.

In an airflow measuring device according to a patent document 2, adhesive is further applied to the lateral surface and the rear surface of a circuit board on the upstream side, in addition to the rear surface of the circuit board on one side. The configuration of the patent document 2 is supposed to restrict the underflow from passing on the rear side of a thin film thereby to reduce adverse effect caused by the underflow and exerted on the surface of a thin film.

Nevertheless, in the configuration of the patent document 2, the enlarged application region with adhesive may cause distortion in the circuit board to result in fluctuation of the characteristics of the sensing element. In addition, characteristics of the sensing element may have a large variation thereamong due to variation in the enlarged application region causing large variation in distortion in the circuit board.

In an airflow measuring device according to a patent document 3, the bottom surface of a recess has a groove located on one side of a thin film to extend from the upstream to the downstream. The configuration of the patent document 3 is supposed to restrict the underflow from passing on the rear side of the thin film thereby to reduce adverse effect caused by the underflow and exerted on the surface of the thin film.

Nevertheless, similarly to the configuration of the patent document 1, the groove is formed in the enlarged area not to be entirely covered with the circuit board, and therefore, dust may adhere partially to the enlarged area and may stack in the groove. In this case, such dust stuck in the groove may cause fluctuation in both the underflow and airflow on the front side of the circuit board to impair the measurement accuracy.

A patent document 4 discloses an airflow measuring device with a configuration supposed to reduce its manufacturing cost, to reduce fluctuation in characteristic, to reduce variation among products, and to reduce accumulation of dust. Specifically, in the airflow measuring device according to the patent document 4, the bottom surface of a recess has a groove, which overlaps with a thin film and is enlarged toward the upstream thereby to reduce turbulence of the underflow and to stabilize an output signal from a sensing portion with the overlapping configuration between the groove and the thin film.

It is noted that, an airflow measuring device is strongly demanded to have an extended detection range at the high flow rate side. It is conceivable that, as the flow rate increases, further turbulence may cause in the underflow. Therefore, further improvement is desired in order to enable extension of the detection range at the high flow rate side.

(Patent document 1)
U.S. Pat. No. 5,723,784 corresponding to Japanese patent No. 3967402
(Patent document 2)
Publication of unexamined US patent application No. 20100313651 corresponding to Publication of unexamined Japanese patent application No. 2010-286393
(Patent document 3)
Publication of unexamined US patent application No. 20080053215 corresponding to Publication of unexamined Japanese patent application No. 2008-058131
(Patent document 4)
Publication of unexamined Japanese patent application No. 2010-281809

SUMMARY

It is an object of the present disclosure to produce an airflow measuring device configured to enable extension of its detection range to the high flow rate side by restricting turbulence in an underflow passing below a thin film thereby to stabilize an output signal from an element equipped on the surface of the thin film.

According to an aspect of the present disclosure, an airflow measuring device comprises an element located in a passage and configured to change an electric input-and-output state according to an airflow through the passage. The airflow measuring device further comprises a circuit board being in a flat and rectangular shape defined by two X-axis sides, which are in parallel with an X-axis direction, and two Y-axis sides, which are in parallel with a Y-axis direction and perpendicular to the X-axis direction. The circuit board has a hollow space depressed from a rear side toward a front side. The circuit board is equipped with a thin film partitioning the front side of the hollow space. The element is equipped to a surface of the thin film. The airflow measuring device further comprises a support member having a recess accommodating the circuit board therein and supporting the circuit board, such that a front side of the circuit board is exposed in the passage, and a direction of airflow on the front side of the circuit board is not in parallel with the X-axis direction. A rear surface of the circuit board is fixed to a bottom surface of the recess on one side in the X-axis direction relative to the thin film, such that air passing on the front side of the circuit board passes through one of the two X-axis sides, which is in parallel with the X-axis direction, and which is located on one side in the Y-axis direction relative to the thin film, thereafter, passes on the front side of the circuit board and moves to a downstream relative to the direction of airflow on the front side. The bottom surface of the recess has a groove in a region, which is on one side in the X-axis direction relative to a position opposed to the thin film, and which is on one side in the Y-axis direction relative to the position opposed to the thin film. The groove is configured to incline a direction of airflow in the groove relative to both the X-axis direction and the Y-axis direction and to guide air in the groove toward the rear side of the thin film.

BRIEF DESCRIPTION OF THE DRAWINGS

The above and other objects, features and advantages of the present invention will become more apparent from the following detailed description made with reference to the accompanying drawings. In the drawings:

FIG. 10 is a top view showing a sensing component of an airflow measuring device according to the seventh embodiment;

FIG. 11 is a top view showing a sensing component of an airflow measuring device according to the eighth embodiment;

DETAILED DESCRIPTION (Configuration of First Embodiment)

Figure 1:
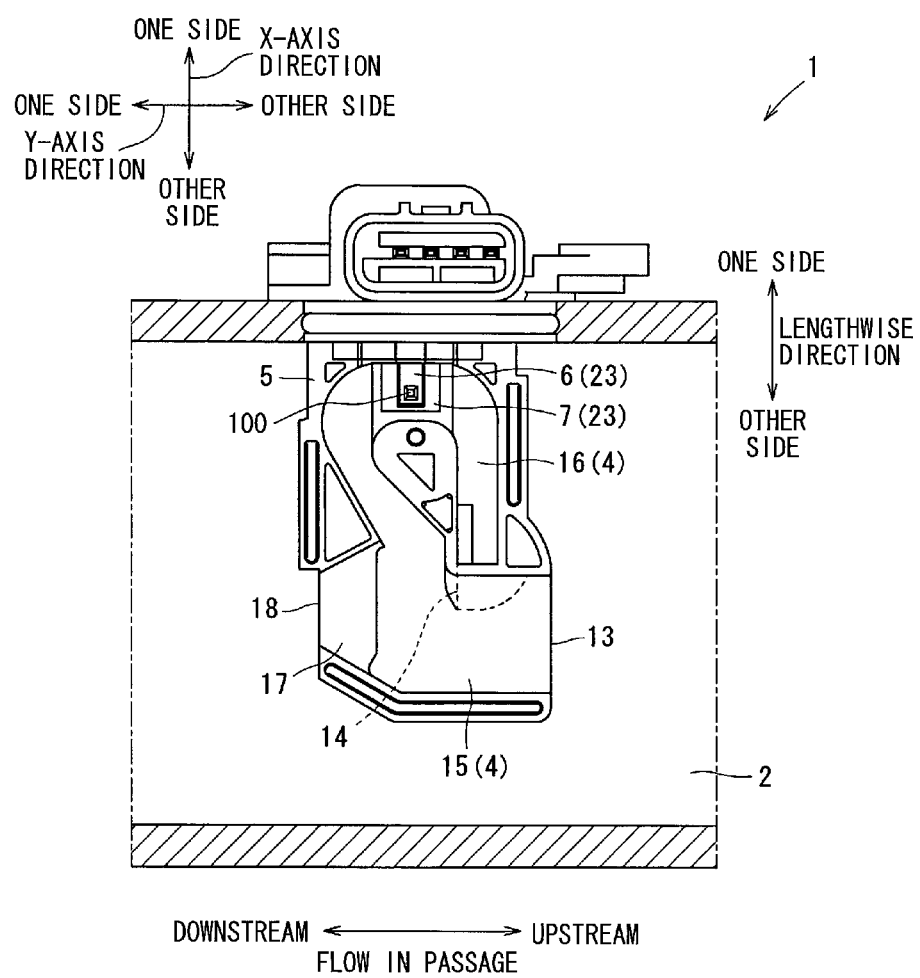
FIG. 1 is a schematic sectional view showing an airflow measuring device according to the first embodiment.

Configurations of an airflow measuring device 1 according to the first to fourth embodiments will be described with reference to FIG. 1 to FIG. 4B. The airflow measuring device 1 employs a thermal-type measuring configuration to measure a flow rate of air based on heat transfer from a heating element to air. The airflow measuring device 1 is located in an air intake passage 2 of an internal combustion engine (not shown). The airflow measuring device 1 is configured to receive a part of intake air, which flows through the air intake passage 2, and to generate an electric signal according to the flow rate (intake air amount) of intake air.

The airflow measuring device 1 is further configured to implement a predetermined processing on the generated electric signal and to send the processed electric signal to another electronic control unit (not shown). The other electronic control unit acquires the intake air amount according to the signal received from the airflow measuring device 1 and implements various kinds of control operations, such as a fuel injection control, according to the intake air amount.

The airflow measuring device 1 includes a case 5, an element group 100, a circuit board 6 for semiconductors, and a support member 7. The case 5 defines a bypass passage 4 configured to receive airflow therethrough. The element group 100 includes components such as a heating element located in the bypass passage 4. The circuit board 6 is equipped with semiconductors of the element group 100. The support member 7 accommodates and supports the circuit board 6.

Various elements of the element group 100 are configured to change its electric input-and-output state according to the intake air amount in the bypass passage 4. For example, the element group 100 is formed as a vapor deposition film of a semiconductor material or a metal material on the circuit board 6. The circuit board 6 is a rectangular plate-shape component having a hollow space 9 and a thin film 11. The hollow space 9 is depressed frontward from the rear surface of the circuit board 6. The thin film 11 partitions the front side of the hollow space 9. The element group 100 is equipped on the surface of the thin film 11.

The rectangular shape of the circuit board 6 is defined with two perpendicular sides including one side (X-axis side) in parallel with the X-axis direction and the other side (Y-axis side) in parallel with the Y-axis direction. Air once passes through one of the two sides of the thin film 11, which is in parallel with the X-axis direction and located on one side in the Y-axis direction. Thereafter, the air further flows downstream along the front side of the circuit board 6.

The bypass passage 4 includes an inlet 13, two outlets 14, a straight passage 15, and a round passage 16. The inlet 13 opens in the air intake passage 2 toward the upstream. The outlets 14 open in the air intake passage 2 toward the downstream. The straight passage 15 linearly extends from the inlet 13 straight from the inlet 13 in the same direction as the flow direction in the air intake passage 2. The round passage 16 guides air, which flows straight through the straight passage 15, to turn therein and further guides the air toward the outlets 14. The round passage 16 branches into two passages at the downstream and directed toward the two outlets 14, respectively. The straight passage 15 linearly connects with a dust exhaust passage 17 for exhausting dust. The dust exhaust passage 17 has a downstream end defining a dust exhaust port 18 opening in the air intake passage 2 toward the downstream.

The support member 7 has a recess 20, in which the circuit board 6 is accommodated. The support member 7 supports the circuit board 6 such that the front side of the circuit board 6 is exposed to the bypass passage 4. In the present state, the flow direction of air on the front side of the circuit board 6, which is in parallel with the flow direction in the bypass passage 4, is substantially perpendicular to the X-axis direction of the circuit board 6. A rear surface 6a of the circuit board 6 is applied with an adhesive 21 only at one side in the X-axis direction relative to the hollow space 9 and is bonded on a bottom surface 20a of the recess 20. In the present configuration, the circuit board 6 is cantilevered by the support member 7.

A gap 22 is formed between the rear surface 6a of the circuit board 6 and the bottom surface 20a of the recess 20. Thus, the cantilever configuration causes air flowing through the bypass passage 4 to flow along the front side of the circuit board 6 and to flow into the gap 22 on the rear side of the circuit board 6 to generate an underflow through the gap 22.

In the present first embodiment, the X-axis direction of the circuit board 6 coincides with the longitudinal direction of the circuit board 6, and the Y-axis direction of the circuit board 6 coincides with the flow direction of air along the front side of the circuit board 6. One side of the circuit board 6 in the Y-axis direction is equivalent to the upstream of the flow direction of air on the front side of the circuit board 6. The other side of the circuit board 6 in the Y-axis direction is equivalent to the downstream of the flow direction of air on the front side of the circuit board 6.

The element group 100, the circuit board 6, the support member 7 and the like are constructed to form a single component as a sub-assembly 23. Referring to FIG. 1, the sub-assembly 23 is inserted in the case 5, such that the circuit board 6 is located at the bottommost position in the round passage 16 and is projected at the farthermost position relative to the straight passage 15. At the position where the circuit board 6 is projected in the round passage 16, air flows in a flow direction opposite to the flow direction of air in both the straight passage 15 and the air intake passage 2.

In the above-described airflow measuring device 1, the element group 100 is not located directly in the air intake passage 2 but is located in the bypass passage 4. With the present configuration, the airflow measuring device 1 is enabled to obtain a detection result with a small fluctuation, without being exerted directly with an influence of turbulence of intake air passing through the air intake passage 2. In addition, the airflow measuring device 1 is equipped with the round passage 16 and the like defining the bent channel thereby to elongate the passage length of the bypass passage 4 compared with the configuration in which air passes straight through the air intake passage 2 without passing through the bypass passage 4. Thus, the airflow measuring device 1 is configured to reduce a detection error, which is a negative value caused in the detection value due to pulsation generated in intake air.

(Feature of First Embodiment)

Further detailed configurations of the airflow measuring device 1 according to the first embodiment will be described with reference to FIG. 1 to FIG. 4B. As shown in FIG. 3A to FIG. 4B, the airflow measuring device 1 has a groove 25 on the bottom surface 20a of the recess 20. The groove 25 is located in a region on one side in the X-axis direction relative to the position where the bottom surface 20a of the recess 20 is opposed to the thin film 11. The groove 25 is located in a region on one side in the Y-axis direction relative to the position where the bottom surface 20a of the recess 20 is opposed to the thin film 11.

The recess 20 is depressed from the surface of the support member 7 and is in a rectangular shape substantially coinciding with the shape of the circuit board 6. The recess 20 is defined with the bottom surface 20a, a lateral side 20b on one side in the Y-axis direction, a lateral side 20c on the other side in the Y-axis direction, and a lateral side 20d on the other side in the X-axis direction. The circuit board 6 has the rear surface 6a, a lateral side 6b on one side in the Y-axis direction, a lateral side 6c on the other side in the Y-axis direction, and a lateral side 6d on the other side in the X-axis direction. The rear surface 6a, the lateral sides 6b and 6c, and the lateral side 6d are opposed to the bottom surface 20a, the lateral sides 20b and 20c, and the lateral side 20d, respectively.

Figure 2A:
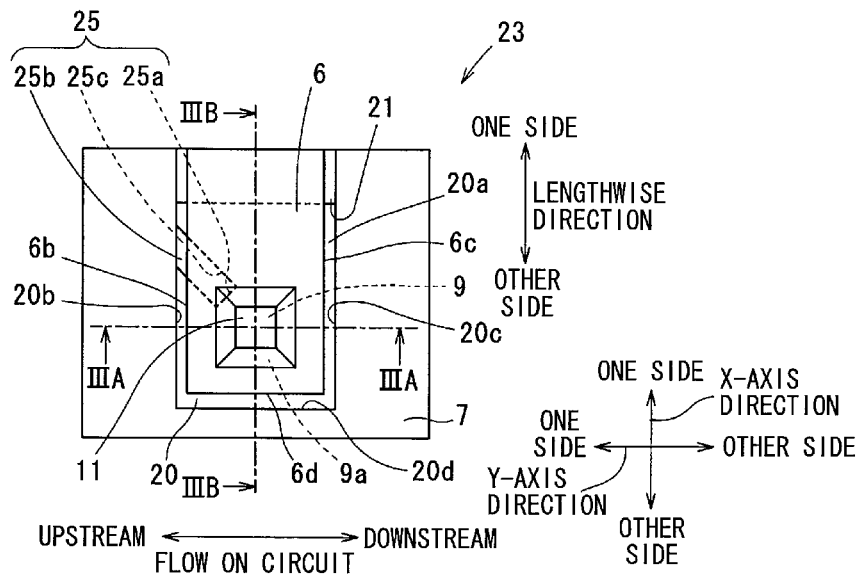
FIG. 2A and FIG. 2B are top views each showing a sensing component of the airflow measuring device according to the first embodiment.
Figure 2B:
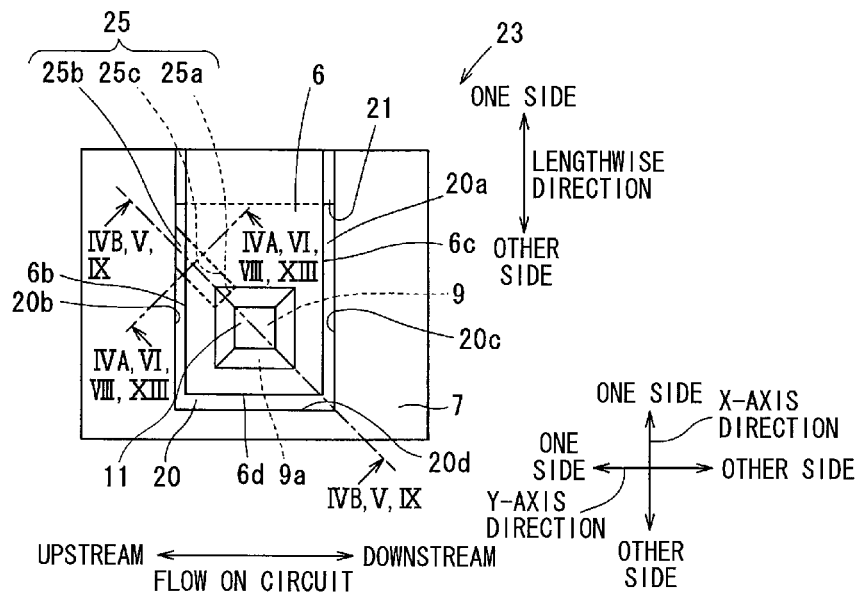
Figure 3A:
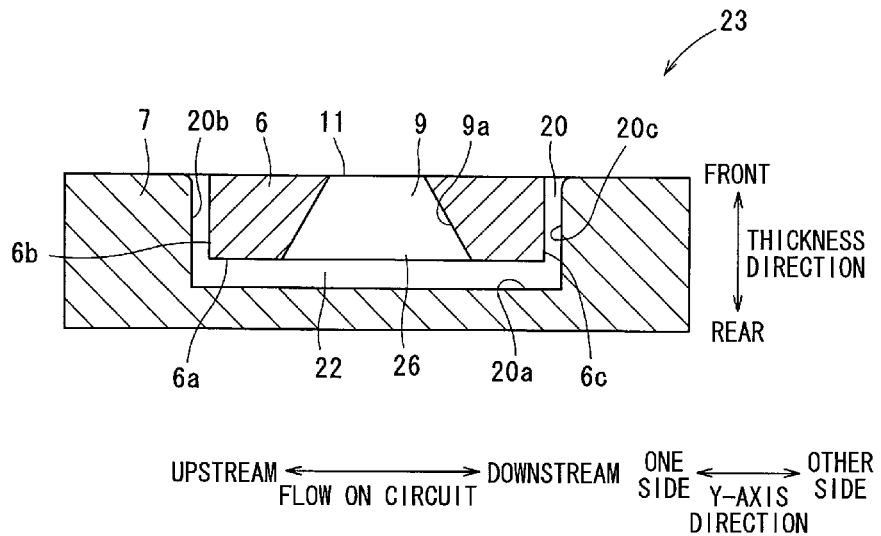
FIG. 3A is a sectional view taken along the line IIIA-IIIA in FIG. 2A.
Figure 3B:
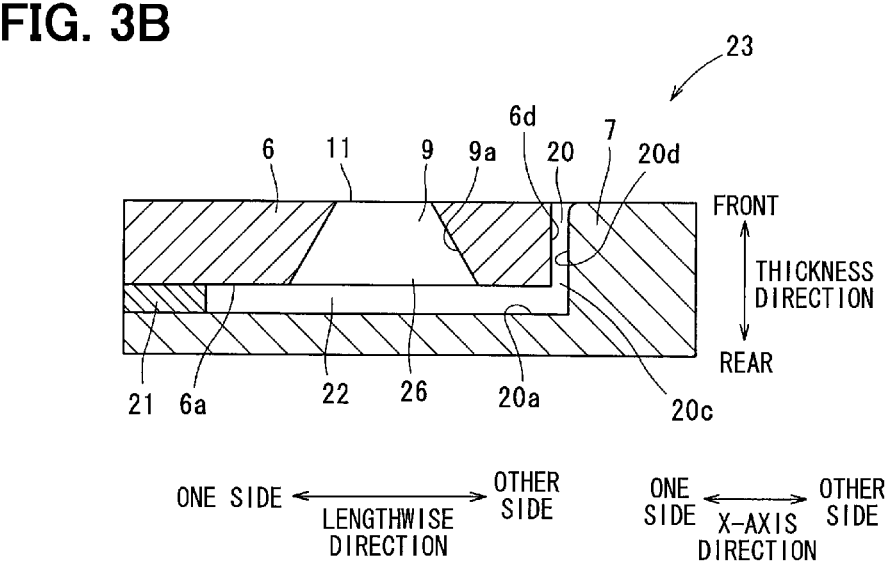
FIG. 3B is a sectional view taken along the line IIIB-IIIB in FIG. 2A, according to the first embodiment.
Figure 4A:
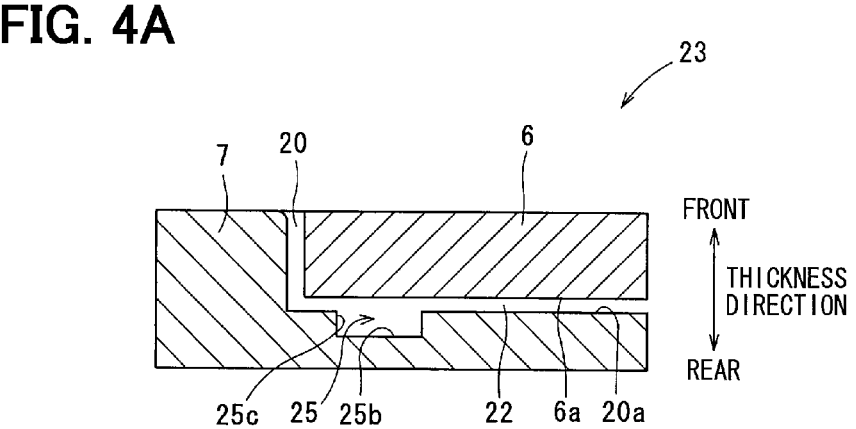
FIG. 4A is a sectional view taken along the line IVA-IVA in FIG. 2B.
Figure 4B:
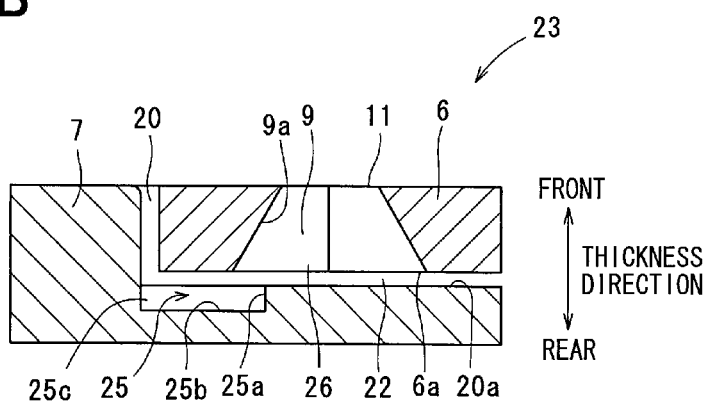
FIG. 4B is a sectional view taken along the line IVB-IVB in FIG. 2B, according to the first embodiment.

As shown in FIG. 2A and FIG. 2B, the groove 25 is in a linear shape and is inclined relative to both the X-axis direction and the Y-axis direction. The groove 25 is formed in the bottom surface 20a to extend from the intersection between the lateral side 20b and the bottom surface 20a. More specifically, the groove 25 extends from a position on one side relative to the thin film 11 in the X-axis direction toward a position where the bottom surface 20a is opposed to the thin film 11. The present configuration rectifies airflow in the groove 25 to be inclined relative to both the X-axis direction and the Y-axis direction and to be directed toward the hollow space 9 on the rear side of the thin film 11.

The hollow space 9 is defined with tapered hollow wall surfaces 9a to have a cross-sectional area, which is perpendicular to the thickness direction of the circuit board 6. The cross-sectional area of the hollow space 9 decreases in the direction from a rear side opening 26 to the front side in the thickness direction. In the circuit board 6, the hollow space 9 and the thin film 11 are located at a position deviated in the X-axis direction and centered in the Y-axis direction. Each of the thin film 11 and the rear side opening 26 is in a square shape. Each of the thin film 11 and the rear side opening 26 has two perpendicular sides, which are in parallel with the X-axis direction and the Y-axis direction, respectively.

The thin film 11 and the rear side opening 26 are concentrically arranged in the thickness direction of the circuit board 6. The hollow wall surfaces 9a include four tapered trapezoid surfaces, which are identical to each other. A downstream end 25a of the groove 25 extends to a position where the bottom surface 20a is opposed to the tapered hollow wall surfaces 9a. The downstream end 25a of the groove 25 does not extend to a position where the bottom surface 20a is opposed to the thin film 11.

(Effect of First Embodiment)

In the airflow measuring device 1 according to the present first embodiment, referring to FIG. 2A and FIG. 2B, the groove 25 is formed on the bottom surface 20a of the recess 20 of the support member 7. The groove 25 is located in the region on one side in the X-axis direction relative to the position where the bottom surface 20a of the recess 20 is opposed to the thin film 11. The groove 25 is located in the region on one side in the Y-axis direction relative to the position where the bottom surface 20a of the recess 20 is opposed to the thin film 11. The groove 25 guides airflow in the groove 25 to be inclined relative to both the X-axis direction and the Y-axis direction and to be directed toward the rear side of the thin film 11.

The present configuration rectifies and guides the underflow toward the rear side of the thin film 11 in the region, which is located on one side in both the X-axis direction and the Y-axis direction relative to the position where the bottom surface 20a is opposed to the thin film 11. Therefore, even in a case where a detection range of the airflow measuring device 1 is changed to its high flow rate side, the underflow is restricted from causing turbulence. Thus, stability of the output signal from the element group 100 equipped on the surface of the thin film 11 can be enhanced.

According to the present embodiment, the rear surface 6a of the circuit board 6 is bonded to the bottom surface 20a of the recess 20 with the adhesive 21. Thus, the region of the rear side of the circuit board 6 on one side in the X-axis direction relative to the thin film 11 is partitioned with the adhesive 21 on one side in the X-axis direction. With the present configuration, the underflow in the region on one side in the X-axis direction is restricted from moving further toward one side in the X-axis direction beyond the adhesive 21 thereby to form a high-pressure region around the adhesive 21. Accordingly, the underflow in the region on one side in the X-axis direction is turned toward the other side in the X-axis direction. In addition, as the intake air amount passing through the bypass passage 4 increases, pressure around the adhesive 21 increases. Therefore, the underflow turns quickly, as the intake air amount passing through the bypass passage 4 increases.

In consideration of this, the groove 25 is formed in the region of the bottom surface 20a of the recess 20 on one side in both the X-axis direction and the Y-axis direction relative to the position where the thin film 11 is opposed to the bottom surface 20a. In addition, the groove 25 is formed to incline airflow in the groove 25 relative to both the X-axis direction and the Y-axis direction toward the rear side of the thin film 11.

The present configuration turns the underflow near the adhesive 21 thereby to enhance rectification of the underflow. Therefore, even when the detection range of the airflow measuring device 1 is widened to the high flow rate side, the underflow can be restrained from causing turbulence. Thus, stability of the output signal from the element group 100 equipped on the surface of the thin film 11 can be enhanced.

In addition, the downstream end 25a of the groove 25 extends to the position where the bottom surface 20a is opposed to the tapered hollow wall surfaces 9a. Furthermore, the downstream end 25a of the groove 25 does not extend to the position where the bottom surface 20a is opposed to the thin film 11. The present configuration can notably enhance rectification of the underflow.

More specifically, in a configuration where the downstream end 25a of the groove 25 does not extend to the position opposed to the hollow wall surface 9a, the underflow may cause turbulence while moving from the downstream end 25a of the groove 25 before arriving at the rear side of the thin film 11. In consideration of this, the downstream end 25a of the groove 25 is extended to the position opposed to the tapered hollow wall surfaces 9a thereby to enhance rectification of the underflow.

Furthermore, the bypass passage 4 has the round passage 16 turning airflow therein. In addition, the circuit board 6 is located in the round passage 16. In a turning passage or at the downstream of a turning passage, pressure of air is apt to increase at the radially outside or at the outer circumference. It is noted that, the circuit board 6 is located in the airflow measuring device 1, such that the one side in the X-axis direction coincides with the radially outside in the turning passage, and the other side in the X-axis direction coincides with the radially inside in the turning passage. Therefore, the underflow is further remarkably turned.

Thus, the groove 25 is enabled significantly effectively to rectify the underflow in the configuration where the circuit board 6 is located in the round passage 16, which forms the turning passage in the bypass passage 4.

Herein, the thermal-type airflow measuring device 1 is configured to measure airflow with pulsation. It is noted that, the thermal-type measuring configuration causes a measurement error as a negative value to decrease its detection result. In consideration of this, the bypass passage 4 is equipped to form the turning passage thereby to address the measurement error as a negative value caused by pulsation. Consequently, the airflow measuring device 1 is configured to significantly and effectively rectify the underflow by utilizing the groove 25.

(Second Embodiment)

Figure 5:
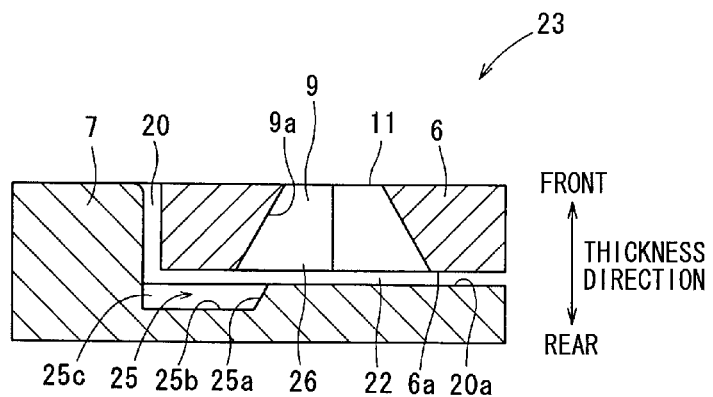
FIG. 5 is a sectional view taken along the line V-V in FIG. 2B and showing a sensing component of an airflow measuring device according to the second embodiment.

As shown in FIG. 5, in the airflow measuring device 1 according to the second embodiment, a sidewall 25c of the groove 25 is inclined at least in the downstream end 25a and is substantially in parallel with the tapered hollow wall surface 9a. The present configuration of the groove 25 is notably enabled to enhance rectification of the underflow.

(Third Embodiment)

Figure 6:
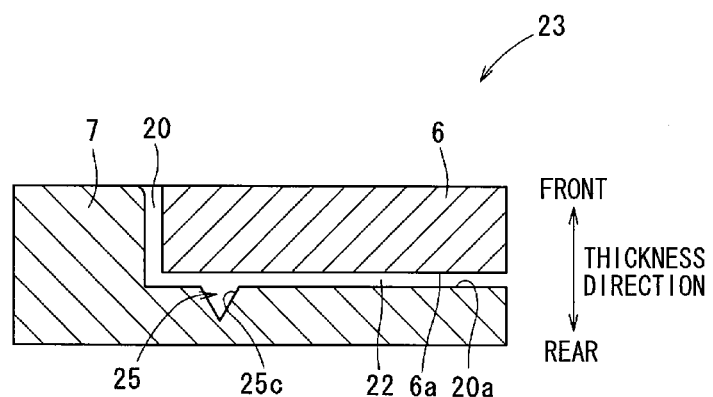
FIG. 6 is a sectional view taken along the line VI-VI in FIG. 2B and showing a sensing component of an airflow measuring device according to the third embodiment.

As shown in FIG. 6, in the airflow measuring device 1 according to the third embodiment, the groove 25 has the cross section perpendicular to the direction of airflow in the groove 25, and the cross section is substantially in a V-shape. The present configuration of the groove 25 is notably enabled to enhance rectification of the underflow.

(Fourth Embodiment)

Figure 7:
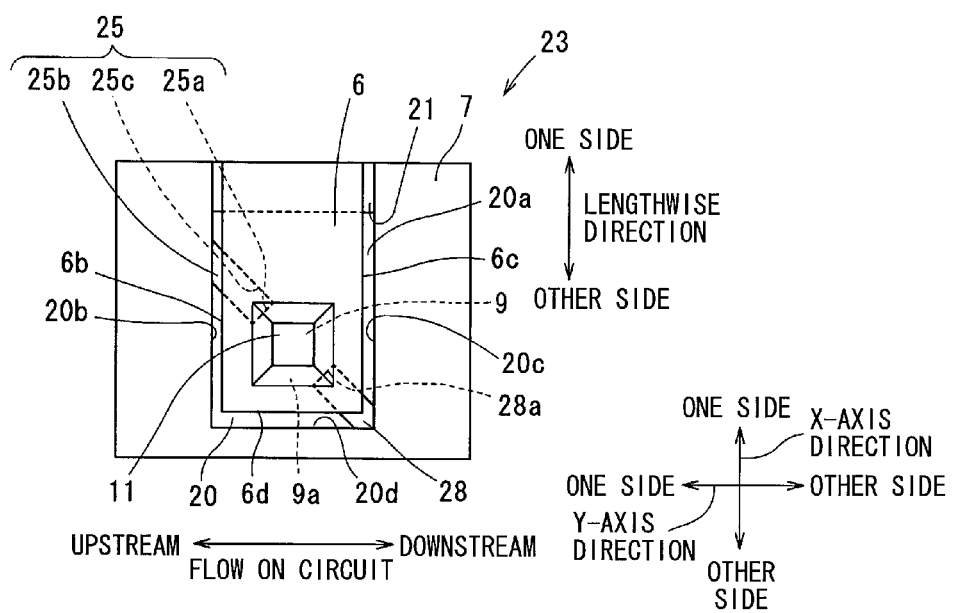
FIG. 7 is a top view showing a sensing component of an airflow measuring device according to the fourth embodiment.

As shown in FIG. 7, in the airflow measuring device 1 according to the fourth embodiment, the bottom surface 20a of the recess 20 has a second groove 28 in a region on the other side in the X-axis direction relative to the position opposed to the thin film 11 and on the other side in the Y-axis direction relative to the position opposed to the thin film 11.

The second groove 28 is in a linear shape and is inclined relative to both the X-axis direction and the Y-axis direction. The second groove 28 is formed in the bottom surface 20a to extend from the intersection among the lateral side 20c, the lateral side 20d, and the bottom surface 20a toward the position opposed to the thin film 11. The present configuration rectifies airflow in the second groove 28 to incline the airflow relative to both the X-axis direction and the Y-axis direction and to guide the airflow in the second groove 28 to the other side in the X-axis direction and to the other side in the Y-axis direction.

A downstream end 28a of the second groove 28 extends to a position opposed to the tapered hollow wall surfaces 9a. The downstream end 28a of the second groove 28 does not extend to a position opposed to the thin film 11. The present configuration of the groove 25 is notably enabled to enhance rectification of the underflow.

(Fifth Embodiment)

Figure 8:
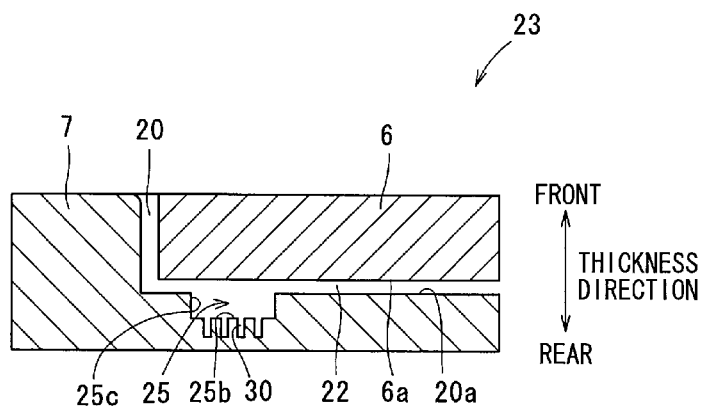
FIG. 8 is a sectional view taken along the line VIII-VIII in FIG. 2B and showing a sensing component of an airflow measuring device according to the fifth embodiment.

As shown in FIG. 8, in the airflow measuring device 1 according to the fifth embodiment, slits 30 are formed on a bottom surface 25b of the groove 25 along the direction of airflow in the groove 25. The present configuration of the groove 25 is notably enabled to enhance rectification of the underflow.

(Sixth Embodiment)

Figure 9:
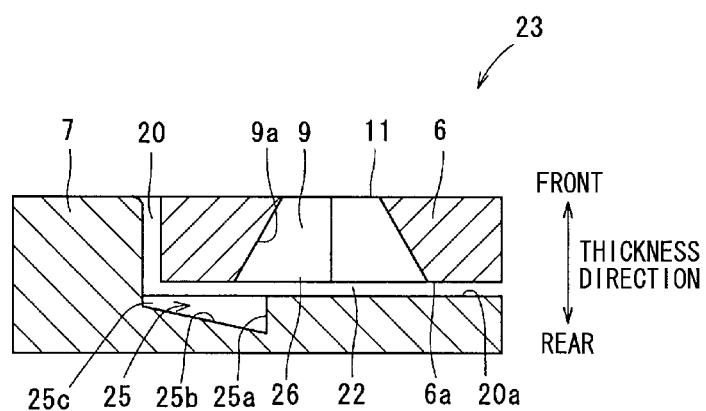
FIG. 9 is a sectional view taken along the line IX-IX in FIG. 2B and showing a sensing component of an airflow measuring device according to the sixth embodiment.

As shown in FIG. 9, in the airflow measuring device 1 according to the sixth embodiment, the groove 25 is deepened as being closer to the thin film 11. The present configuration of the groove 25 is notably enabled to enhance rectification of the underflow.

(Seventh Embodiment)

As shown in FIG. 10, in the airflow measuring device 1 according to the seventh embodiment, the groove 25 is widened as being closer to the thin film 11. The present configuration of the groove 25 is notably enabled to enhance rectification of the underflow.

(Eighth Embodiment)

The configuration of the airflow measuring device 1 according to the eighth embodiment will be described with reference to FIG. 11. A first gap 32 is formed between the lateral side (one X-axis side) 6b and the lateral side 20b on one side of the circuit board 6 in the Y-axis direction to extend in the X-axis direction. A second gap 33 is formed between the lateral side (one Y-axis side) 6d and the lateral side 20d on the other side of the circuit board 6 in the X-axis direction to extend in the Y-axis direction. A third gap 34 is formed between the lateral side (other X-axis side) 6c and the lateral side 20c on the other side of the circuit board 6 in the Y-axis direction to extend in the X-axis direction.

A width 33w of the second gap 33 in the X-axis direction is greater than or equivalent to a width 32w of the first gap 32 in the Y-axis direction in the entire region in the Y-axis direction. The width 33w is the largest in the region on the other side in the Y-axis direction relative to the downstream end of the groove 25, among the entire region in the Y-axis direction. More specifically, the width 33w is substantially constant in the region on one side in the Y-axis direction relative to the other end of the thin film 11 in the Y-axis direction and in the region on the other side in the Y-axis direction relative to the other end of the thin film 11 in the Y-axis direction. The width 33w in the region on the other side in the Y-axis direction relative to the other end of the thin film 11 in the Y-axis direction is greater than the width 33w in the region on one side in the Y-axis direction relative to the other end of the thin film 11 in the Y-axis direction.

The present configuration of the groove 25 is notably enabled to enhance rectification of the underflow. It is noted that, the width 33w in the region on the other side in the Y-axis direction relative to the other end of the thin film 11 in the Y-axis direction is greater than a width 34w of the third gap 34 in the Y-axis direction. The present configuration is also advantageous in rectification of the underflow by utilizing the groove 25.

(Ninth Embodiment)

Figure 12:
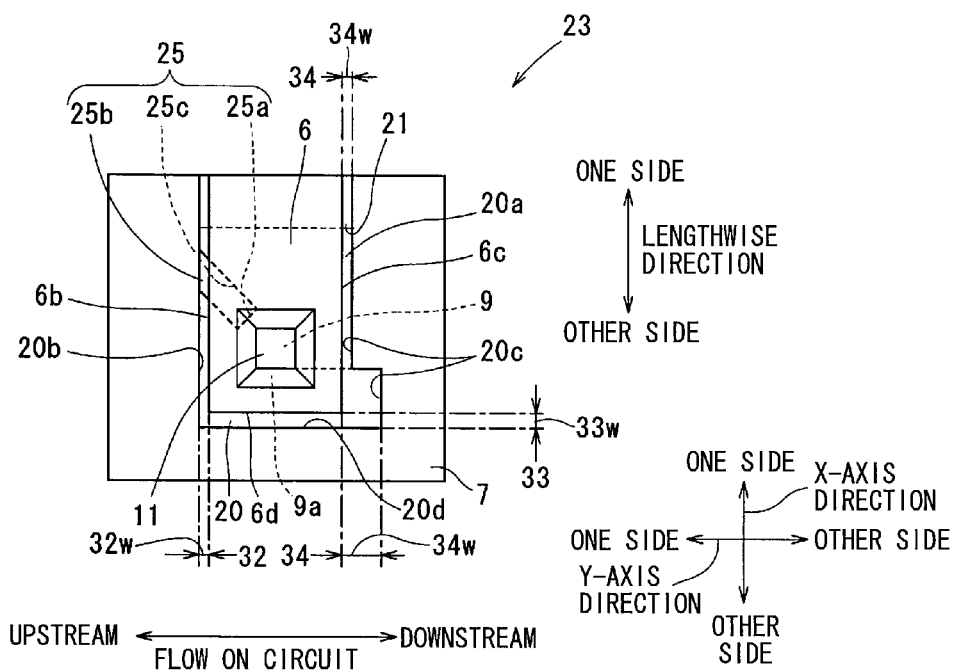
FIG. 12 is a top view showing a sensing component of an airflow measuring device according to the ninth embodiment.

As shown in FIG. 12, in the airflow measuring device 1 according to the ninth embodiment, the width 34w of the third gap 34 in the Y-axis direction is greater than or equivalent to the width 32w of the first gap 32 in the Y-axis direction in the entire region in the X-axis direction. The width 34w is the largest in the region on the other side in the X-axis direction relative to the downstream end of the groove 25, among the entire region in the X-axis direction. More specifically, the width 34w is substantially constant in the region on one side in the X-axis direction relative to the other end of the thin film 11 in the X-axis direction and in the region on the other side in the X-axis direction relative to the other end of the thin film 11 in the X-axis direction. The width 34w in the region on the other side in the X-axis direction relative to the other end of the thin film 11 in the X-axis direction is greater than the width 34w in the region on one side in the X-axis direction relative to the other end of the thin film 11 in the X-axis direction.

The present configuration of the groove 25 is notably enabled to enhance rectification of the underflow. It is noted that, the width 34w in the region on the other side in the X-axis direction relative to the other end of the thin film 11 in the X-axis direction is greater than the width 33w. The present configuration is also advantageous in rectification of the underflow by utilizing the groove 25.

(Modification)

The configuration of the airflow measuring device 1 is not limited to those in the first to ninth embodiments, and various modifications of the airflow measuring device 1 may be conceivable.

For example, in the airflow measuring device 1 according to the second embodiment to the ninth embodiment, one additional configuration is equipped in each embodiment in order to enhance the rectification effect of the groove 25. It is noted that, multiple additional configurations of any of the second embodiment to the ninth embodiment may be equipped to the airflow measuring device 1, as long as the multiple additional configurations do not cause discrepancy.

Figure 13:
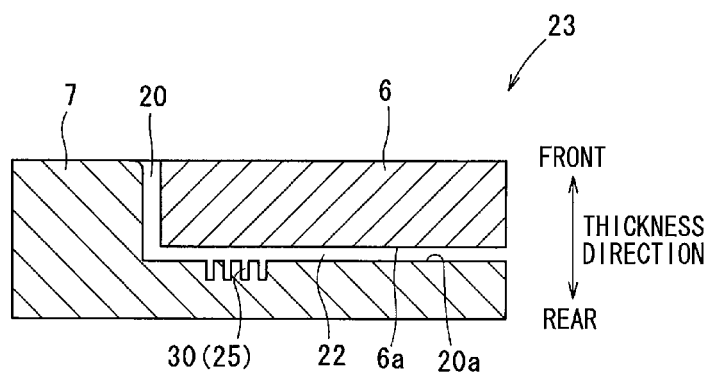
FIG. 13 is a sectional view taken along the line XIII-XIII in FIG. 2B and showing a sensing component of an airflow measuring device according to a modification.

In the airflow measuring device 1 according to the fifth embodiment, the slits 30 are formed on the bottom surface 25b of the groove 25. It is noted that, as shown in FIG. 13, multiple slits 30 may be formed on the bottom surface 20a of the recess 20, and the slits 30 may be caused to function as the groove 25. The number of the groove 25 is not limited to one, and multiple grooves 25 may be formed.

In the airflow measuring device 1 according to the first embodiment to the ninth embodiment, the groove 25 is in a singular linear shape. It is noted that, the groove 25 may be in a curved shape and may be in a shape of a combination of a linear shape and a curved shape.

In the airflow measuring device 1 according to the first embodiment to the ninth embodiment, the element group 100, the circuit board 6, and the support member 7 are located in the bypass passage 4 defined in the case 5. It is noted that, the element group 100, the circuit board 6, and the support member 7 may be equipped, for example, directly in the air intake passage 2.

Figure 14A:
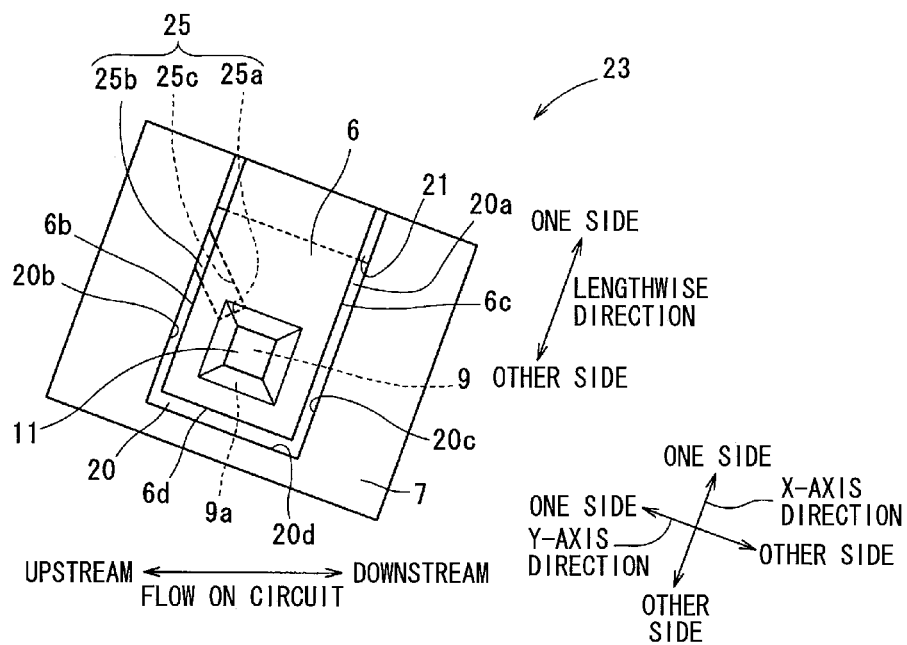
FIG. 14A and FIG. 14B are top views each showing a sensing component of an airflow measuring device according to a modification.
Figure 14B:
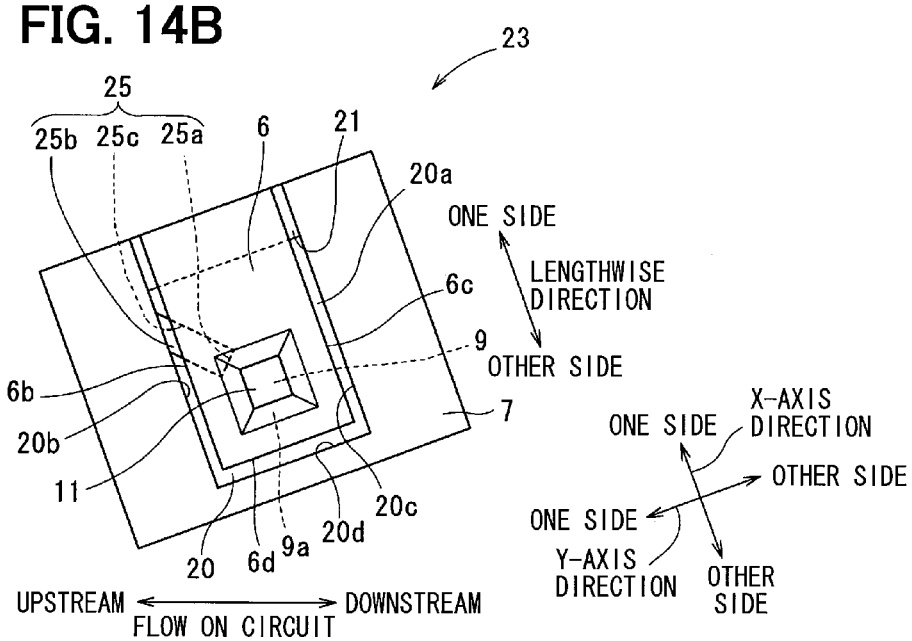

In the airflow measuring device 1 according to the first embodiment to the ninth embodiment, the Y-axis direction coincides with the direction of airflow on the front side of the circuit board 6. For example, as shown in FIG. 14A and FIG. 14B, both the X-axis direction and the Y-axis direction may be inclined relative to the direction of airflow on the front side of the circuit board 6.

In the airflow measuring device 1 according to the first embodiment to the ninth embodiment, the X-axis direction coincides with the longitudinal direction of the circuit board 6. It is noted that, the X-axis direction may coincide with a short-side direction, which is perpendicular to the longitudinal direction of the circuit board 6. In this case, the adhesive 21 may be applied only to the rear surface 6a on one side in the short-side direction.

In the airflow measuring device 1 according to the first embodiment to the ninth embodiment, the downstream end 25a of the groove 25 does not extend to the position opposed to the thin film 11. It is noted that, the downstream end 25a of the groove 25 may be extended to the position opposed to the thin film 11.

In a case where the downstream end 25a of the groove 25 is extended excessively, the underflow may easily intrude into the rear side of the thin film 11.

Consequently, the intake air amount may excessively increase on the rear side of the thin film 11 to cause turbulence. In consideration of this, in a configuration where the downstream end 25a is extended to the position opposed to the thin film 11, it is conceivable, for example, not to extend the downstream end 25a to the other side in the X-axis direction and to the other side in the Y-axis direction beyond the position opposed to the center of the thin film 11. That is, it may be preferable not to extend the downstream end 25a beyond the position opposed to the intersection of the diagonal lines defined by the square shape of the thin film 11 to the other side in both the X-axis direction and the Y-axis direction.

Figure 15:
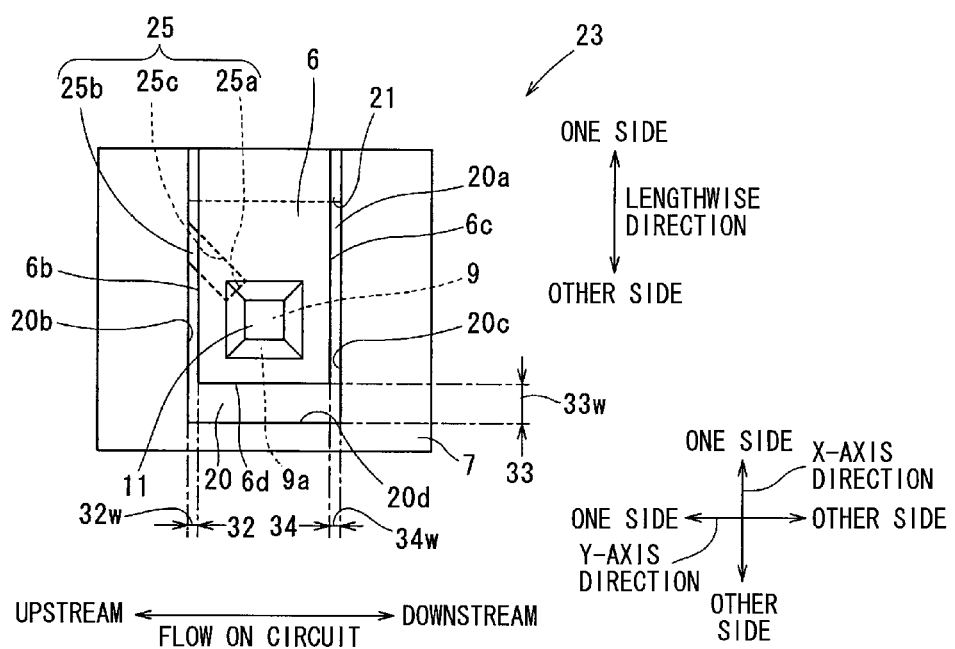
FIG. 15 is a top view showing a sensing component of an airflow measuring device according to a modification.

In the airflow measuring device 1 according to the eighth embodiment, the width 33w in the region on the other side in the Y-axis direction relative to the other end of the thin film 11 in the Y-axis direction is greater than the width 33w in the region on one side in the Y-axis direction relative to the other end of the thin film 11 in the Y-axis direction. The configuration of the width 33w is not limited to that in the eighth embodiment. For example, in the case of the width 33w in the eighth embodiment, the other end of the thin film 11 in the Y-axis direction is defined as the boundary between the greater width 33w and the smaller width 33w. It is noted that, for example, the downstream end of the groove 25 may be set as the boundary between the greater width 33w and the smaller width 33w. Alternatively, the boundary between the greater width and the smaller width may not be set. For example, as shown in FIG. 15, the width 33w may be greater than the width 32w and the width 34w in the entire region in the Y-axis direction.

Figure 16:
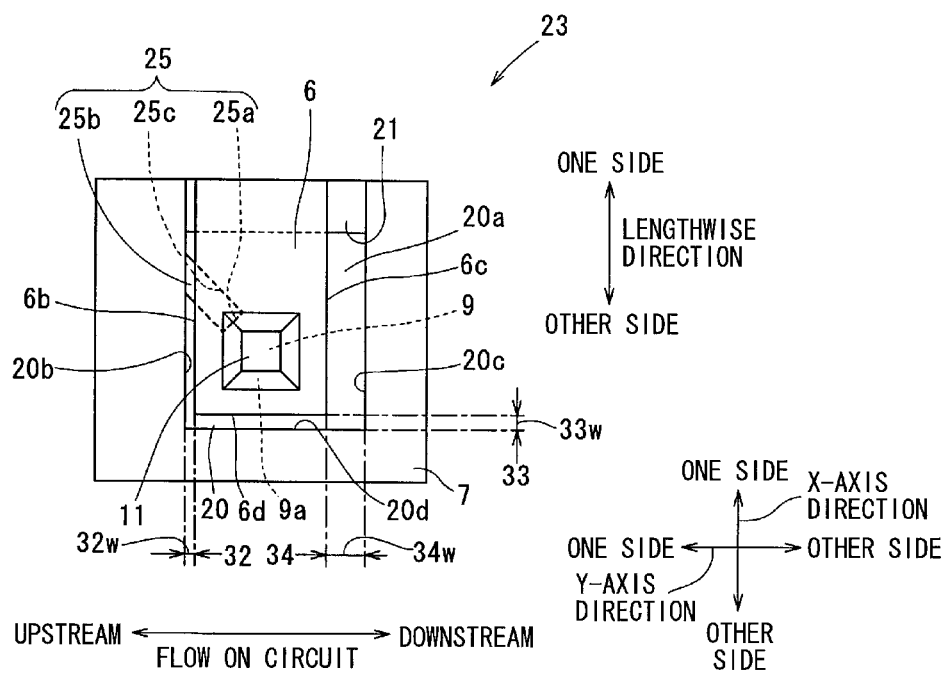
FIG. 16 is a top view showing a sensing component of an airflow measuring device according to a modification.

In the airflow measuring device 1 according to the ninth embodiment, the width 34w in the region on the other side in the X-axis direction relative to the other end of the thin film 11 in the X-axis direction is greater than the width 34w in the region on one side in the X-axis direction relative to the other end of the thin film 11 in the X-axis direction. The configuration of the width 34w is not limited to that in the ninth embodiment. For example, in the case of the width 34w in the ninth embodiment, the other end of the thin film 11 in the X-axis direction is defined as the boundary between the greater width 34w and the smaller width 34w. It is noted that, for example, the downstream end of the groove 25 may be set as the boundary between the greater width 34w and the smaller width 34w. Alternatively, the boundary between the greater width and the smaller width may not be set. For example, as shown in FIG. 16, the width 34w may be greater than the width 32w and the width 33w in the entire region in the X-axis direction.

The above-described airflow measurement device may include: the element located in the predetermined passage and configured to change the electric input-and-output state according to the airflow through the passage; the circuit board being in the flat and rectangular shape defined by two sides (X-axis sides), which are in parallel with the X-axis direction, and two sides (Y-axis sides), which are in parallel with the Y-axis direction perpendicular to the X-axis direction, the circuit board having the hollow space depressed from the rear side toward the front side, the circuit board being equipped with the thin film partitioning the front side of the hollow space, the element is equipped to the surface of the thin film; and the support member having the predetermined recess, the support member accommodating the circuit board in the recess and supporting the circuit board, such that the front side of the circuit board is exposed in the passage, and the direction of airflow on the front side of the circuit board is not in parallel with the X-axis direction.

The rear surface of the circuit board may be fixed to the bottom surface of the recess on one side in the X-axis direction relative to the thin film, such that air passing on the front side of the circuit board passes through one of the two sides, which is in parallel with the X-axis direction, and which is located on one side relative to the thin film in the Y-axis direction, thereafter, passes on the front side of the circuit board and moves to the downstream relative to the direction of airflow on the front side. The bottom surface of the recess may have the groove in the region, which is on one side in the X-axis direction relative to the position opposed to the thin film, and which is on one side in the Y-axis direction relative to the position opposed to the thin film. The groove may be configured to incline the direction of airflow in the groove relative to the X-axis direction and the Y-axis direction and to guide air in the groove toward the rear side of the thin film.

The present configuration rectifies and guides the underflow toward the rear side of the thin film in the region, which is located on one side in the X-axis direction relative to the position opposed to the thin film and on one side in the Y-axis direction relative to the position opposed to the thin film. Therefore, even in a case where a detection range of the airflow measuring device is changed to its high flow rate side, the underflow is restricted from causing turbulence. Thus, stability of the output signal from the element equipped on the surface of the thin film can be enhanced.

More specifically, the fixed region between the rear surface of the circuit board and the bottom surface of the recess partitions the region of the rear side of the circuit board on one side in the X-axis direction relative to the thin film. With the present configuration, the underflow in the region on one side in the X-axis direction is restricted from moving further toward one side in the X-axis direction beyond the fixed region thereby to form the high-pressure region around the fixed region. Accordingly, the underflow in the region on one side in the X-axis direction is turned toward the other side in the X-axis direction. In addition, as the flow rate of air through the passage becomes higher, pressure around the fixed region becomes higher. Therefore, as the flow rate becomes higher, the turning of the airflow becomes steeper.

In consideration of this, the bottom surface of the recess may have the groove in the region, which is on one side in the X-axis direction relative to the position opposed to the thin film, and which is on one side in the Y-axis direction relative to the position opposed to the thin film, such that the groove is configured to incline the direction of airflow in the groove relative to the X-axis direction and the Y-axis direction and to guide air in the groove toward the rear side of the thin film.

The present configuration enhances rectification of the underflow according to the turning of the underflow around the fixed region. Therefore, even when the detection range of the airflow measuring device is widened to the high flow rate side, the underflow can be restrained from causing turbulence. Thus, stability of the output signal from the element equipped on the surface of the thin film can be enhanced.

The hollow space may be defined by the tapered hollow wall surface, such that the hollow space has the cross-sectional area perpendicular to the thickness direction of the circuit board, and the cross-sectional area becomes smaller toward the front side. In this case, the groove may have the downstream end extending to the position opposed to the tapered hollow wall surface, and the downstream end of the groove does not extend to the position opposed to the thin film. The present configuration can notably enhance rectification of the underflow.

More specifically, in a configuration where the downstream end of the groove does not extend to the position opposed to the hollow wall surface, the underflow may cause turbulence while moving from the downstream end of the groove before arriving at the rear side of the thin film. In consideration of this, the groove may have the downstream end extending to the position opposed to the tapered hollow wall surface, and the downstream end of the groove does not extend to the position opposed to the thin film, thereby to enhance rectification of the underflow.

The groove may have the downstream end extending to the position opposed to the thin film. Also, the present configuration can enhance rectification of the underflow.

The passage may have the bent channel, and the circuit board may be located in the bent channel or may be located at the downstream of the bent channel.

In the bent channel or at the downstream of the bent channel, airflow is apt to be high in pressure at the radially outside. Therefore, the underflow further steeply turns in the configuration, where one side of the circuit board in the X-axis direction is arranged on the radially outside of the bent channel, and the other side of the circuit board in the X-axis direction is arranged on the radially inside of the bent channel.

Therefore, the groove may be enabled significantly effectively to rectify the underflow in the configuration where the circuit board is located in the bent channel or located at the downstream of the bent channel. Herein, the thermal-type airflow measuring device is configured to measure airflow with pulsation. It is noted that, the thermal-type measuring configuration causes a measurement error as a negative value to decrease its detection result. In consideration of this, the bypass passage is equipped to form the turning passage thereby to address the measurement error as a negative value caused by pulsation. Therefore, in the thermal-type airflow measuring device configured to measure airflow with pulsation, the groove is further significantly and effectively enabled to rectify the underflow.

The hollow space may be defined by the tapered hollow wall surface, such that the hollow space has the cross-sectional area perpendicular to the thickness direction of the circuit board, and the cross-sectional area becomes smaller toward the front side. In this case, the groove may have the sidewall being inclined to be substantially in parallel with the tapered hollow wall surface at least at the downstream end of the groove. The present configuration can notably cause the groove to enhance rectification of the underflow.

The hollow space may be defined by the tapered hollow wall surface, such that the hollow space has the cross-sectional area perpendicular to the thickness direction of the circuit board, and the cross-sectional area becomes smaller toward the front side. In this case, the groove may have the cross section, which is substantially in a V-shape, perpendicular to the direction of airflow in the groove. The present configuration can notably cause the groove to enhance rectification of the underflow.

The bottom surface of the recess may have the second groove in the region, which is on the other side in the X-axis direction relative to the position opposed to the thin film, and which is on the other side in the Y-axis direction relative to the position opposed to the thin film. In this case, the second groove may be configured to incline the direction of airflow in the second groove relative to the X-axis direction and the Y-axis direction and to guide air in the second groove toward the other side in the X-axis direction and toward the other side in the Y-axis direction. The present configuration can notably cause the groove to enhance rectification of the underflow.

The groove may have the bottom surface defining the slit substantially in parallel with the direction of airflow in the groove. The present configuration can notably cause the groove to enhance rectification of the underflow.

The groove may be deepened as being closer to the thin film. The present configuration can notably cause the groove to enhance rectification of the underflow.

The groove may be widened as being closer to the thin film. The present configuration can notably cause the groove to enhance rectification of the underflow.

One lateral side of the circuit board and one lateral side of the recess may define the first gap therebetween on one side in the Y-axis direction of the circuit board, such that the first gap extends in the X-axis direction. In this case, an other lateral side of the circuit board and an other lateral side of the recess may define the second gap therebetween on the other side in the X-axis direction of the circuit board, such that the second gap extends in the Y-axis direction. In this case, the width of the second gap in the X-axis direction may be greater than or equivalent to the width of the first gap in the Y-axis direction in the entire region in the Y-axis direction. In this case, the width of the second gap in the X-axis direction may be largest in the region on the other side in the Y-axis direction relative to the downstream end of the groove, among the entire region in the Y-axis direction. The present configuration can notably cause the groove to enhance rectification of the underflow.

An other lateral side of the circuit board and an other lateral side of the recess may define the third gap therebetween on the other side in the Y-axis direction of the circuit board, such that the third gap extends in the X-axis direction. In this case, the width of the third gap in the Y-axis direction may be greater than or equivalent to the width of the first gap in the Y-axis direction in the entire region in the X-axis direction. In this case, the width of the third gap in the Y-axis direction may be largest in the region on the other side in the X-axis direction relative to the downstream end of the groove, among the entire region in the X-axis direction. The present configuration can notably cause the groove to enhance rectification of the underflow.

The airflow measurement device according to one example may include: the element located in the predetermined passage and configured to change the electric input-and-output state according to the airflow through the passage; the circuit board being in the flat and rectangular shape defined by two sides (X-axis sides), which are in parallel with the X-axis direction, and two sides (Y-axis sides), which are in parallel with the Y-axis direction perpendicular to the X-axis direction, the circuit board having the hollow space depressed from the rear side toward the front side, the circuit board being equipped with the thin film partitioning the front side of the hollow space, the element is equipped to the surface of the thin film; and the support member having the predetermined recess, the support member accommodating the circuit board in the recess and supporting the circuit board, such that the front side of the circuit board is exposed in the passage, and the direction of airflow on the front side of the circuit board is not in parallel with the X-axis direction.

In this case, the rear surface of the circuit board may be fixed to the bottom surface of the recess on one side in the X-axis direction relative to the thin film, such that air passing on the front side of the circuit board passes through one of the two sides, which is in parallel with the X-axis direction, and which is located on one side relative to the thin film in the Y-axis direction, thereafter, passes on the front side of the circuit board and moves to the downstream relative to the direction of airflow on the front side. In this case, the bottom surface of the recess may have the groove in the region, which is on one side in the X-axis direction relative to the position opposed to the thin film, and which is on one side in the Y-axis direction relative to the position opposed to the thin film. In this case, the groove may be configured to incline the direction of airflow in the groove relative to the X-axis direction and the Y-axis direction and to guide air in the groove toward the rear side of the thin film.

The hollow space may be defined by the tapered hollow wall surface, such that the hollow space has the cross-sectional area perpendicular to the thickness direction of the circuit board, and the cross-sectional area becomes smaller toward the front side. In this case, the groove may have the downstream end extending to the position opposed to the tapered hollow wall surface, and the downstream end of the groove does not extend to the position opposed to the thin film. The passage may have the bent channel, and the circuit board may be located in the bent channel or may be located at the downstream of the bent channel.

In the airflow measurement device according to another example, the groove may have the sidewall being inclined to be substantially in parallel with the tapered hollow wall surface at least at the downstream end of the groove. In the airflow measurement device according to another example, the groove may have the cross section, which is substantially in a V-shape, perpendicular to the direction of airflow in the groove.

In the airflow measurement device according to another example, the bottom surface of the recess may have the second groove in the region, which is on the other side in the X-axis direction relative to the position opposed to the thin film, and which is on the other side in the Y-axis direction relative to the position opposed to the thin film. In this case, the second groove may be configured to incline the direction of airflow in the second groove relative to the X-axis direction and the Y-axis direction and to guide air in the second groove toward the other side in the X-axis direction and toward the other side in the Y-axis direction.

In the airflow measurement device according to another example, the groove may have the bottom surface defining the slit substantially in parallel with the direction of airflow in the groove. In the airflow measurement device according to another example, the groove is deepened as being closer to the thin film. In the airflow measurement device according to another example, the groove is widened as being closer to the thin film.

In the airflow measurement device according to another example, one lateral side of the circuit board and one lateral side of the recess may define the first gap therebetween on one side in the Y-axis direction of the circuit board, such that the first gap extends in the X-axis direction. In this case, an other lateral side of the circuit board and an other lateral side of the recess may define the second gap therebetween on the other side in the X-axis direction of the circuit board, such that the second gap extends in the Y-axis direction. In this case, the width of the second gap in the X-axis direction may be greater than or equivalent to the width of the first gap in the Y-axis direction in the entire region in the Y-axis direction. In this case, the width of the second gap in the X-axis direction may be largest in the region on the other side in the Y-axis direction relative to the downstream end of the groove, among the entire region in the Y-axis direction.

In the airflow measurement device according to another example, an other lateral side of the circuit board and an other lateral side of the recess may define the third gap therebetween on the other side in the Y-axis direction of the circuit board, such that the third gap extends in the X-axis direction. In this case, the width of the third gap in the Y-axis direction may be greater than or equivalent to the width of the first gap in the Y-axis direction in the entire region in the X-axis direction. In this case, the width of the third gap in the Y-axis direction may be largest in the region on the other side in the X-axis direction relative to the downstream end of the groove, among the entire region in the X-axis direction.

The above structures of the embodiments can be combined as appropriate. It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An airflow measuring device comprising:
    an element located in a passage and configured to change an electric input-and-output state according to an airflow through the passage;
    a circuit board being in a flat and rectangular shape defined by two X-axis sides, which are in parallel with an X-axis direction, and two Y-axis sides, which are in parallel with a Y-axis direction and perpendicular to the X-axis direction,
        the circuit board having a hollow space depressed from a rear side toward a front side,
        the circuit board being equipped with a thin film partitioning the front side of the hollow space, and
        the element being equipped to a surface of the thin film; and
    a support member having a recess accommodating the circuit board therein and supporting the circuit board, such that a front side of the circuit board is exposed in the passage, and a direction of airflow on the front side of the circuit board is not in parallel with the X-axis direction, wherein a rear surface of the circuit board is fixed to a bottom surface of the recess on one side in the X-axis direction relative to the thin film, such that air passing on the front side of the circuit board passes through one of the two X-axis sides, which is in parallel with the X-axis direction, and which is located on one side in the Y-axis direction relative to the thin film, thereafter, passes on the front side of the circuit board and moves to a downstream relative to the direction of airflow on the front side, the bottom surface of the recess has a groove in a region, which is on one side in the X-axis direction relative to a position opposed to the thin film, and which is on one side in the Y-axis direction relative to the position opposed to the thin film, the groove is configured to incline a direction of airflow in the groove relative to both the X-axis direction and the Y-axis direction and to guide air in the groove toward the rear side of the thin film, the rear surface of the circuit board and the bottom surface of the recess form a gap, and the groove is a hollow communicating with the gap.

2. The airflow measuring device according to claim 1, wherein the hollow space is defined by a tapered wall surface, the hollow space has a cross-sectional area, which is perpendicular to a thickness direction of the circuit board and reduced toward the front side, the groove has a downstream end extending to a position opposed to the tapered wall surface, and the downstream end of the groove does not extend to a position opposed to the thin film.

3. The airflow measuring device according to claim 1, wherein the groove has a downstream end extending to a position opposed to the thin film.

4. The airflow measuring device according to claim 1, wherein the passage has a bent channel, and the circuit board is located in the bent channel or located at a downstream of the bent channel.

5. The airflow measuring device according to claim 1, wherein the hollow space is defined by a tapered wall surface, the hollow space has a cross-sectional area, which is perpendicular to a thickness direction of the circuit board and reduced toward the front side, and the groove has a sidewall being inclined and substantially in parallel with the tapered wall surface at least at a downstream end of the groove.

6. The airflow measuring device according to claim 1, wherein the hollow space is defined by a tapered wall surface, the hollow space has a cross-sectional area, which is perpendicular to a thickness direction of the circuit board and reduced toward the front side, and the groove has a cross section, which is perpendicular to a direction of airflow in the groove and is substantially in a V-shape.

7. The airflow measuring device according to claim 1, wherein the bottom surface of the recess has a second groove in a region, which is on an other side in the X-axis direction relative to a position opposed to the thin film, and which is on an other side in the Y-axis direction relative to the position opposed to the thin film, and the second groove is configured to incline a direction of airflow in the second groove relative to both the X-axis direction and the Y-axis direction and to guide air in the second groove toward the other side in the X-axis direction and toward the other side in the Y-axis direction.

8. The airflow measuring device according to claim 1, wherein the groove has a bottom surface defining a slit substantially in parallel with a direction of airflow in the groove.

9. The airflow measuring device according to claim 1, wherein the groove is deepened as being closer to the thin film.

10. The airflow measuring device according to claim 1, wherein the groove is widened as being closer to the thin film.

11. The airflow measuring device according to claim 1, wherein one of the two X-axis sides of the circuit board and one lateral side of the recess define a first gap therebetween on one side in the Y-axis direction of the circuit board, the first gap extending in the X-axis direction, one of the two Y-axis sides of the circuit board and an other lateral side of the recess define a second gap therebetween on the other side in the X-axis direction of the circuit board, the second gap extending in the Y-axis direction, a width of the second gap in the X-axis direction is greater than or equivalent to a width of the first gap in the Y-axis direction in an entire region in the Y-axis direction, and the width of the second gap in the X-axis direction is largest in a region on the other side in the Y-axis direction relative to a downstream end of the groove, among the entire region in the Y-axis direction.

12. The airflow measuring device according to claim 1, wherein one of the two X-axis sides of the circuit board and one lateral side of the recess define a first gap therebetween on one side in the Y-axis direction of the circuit board, the first gap extending in the X-axis direction, an other of the two X-axis sides of the circuit board and an other lateral side of the recess define a third gap therebetween on the other side in the Y-axis direction of the circuit board, the third gap extending in the X-axis direction, a width of the third gap in the Y-axis direction is greater than or equivalent to a width of the first gap in the Y-axis direction in an entire region in the X-axis direction, and the width of the third gap in the Y-axis direction is largest in a region on the other side in the X-axis direction relative to a downstream end of the groove, among the entire region in the Y-axis direction.

13. The airflow measuring device according to claim 1, wherein the gap is configured to flow air from the passage therethrough.

* * * * *